United States Patent

Ota et al.

[11] Patent Number: 5,946,099
[45] Date of Patent: Aug. 31, 1999

[54] METHOD OF MEASURING POSITIONS OF OPTICAL TRANSMISSION MEMBERS

[75] Inventors: Takashi Ota, Kasugai; Masashi Fukuyama, Komaki; Hironori Kurimoto, Kounan; Yoshimasa Kondo, Nagoya, all of Japan

[73] Assignee: NGK Insulators, Ltd., Japan

[21] Appl. No.: 08/910,351

[22] Filed: Aug. 13, 1997

[30] Foreign Application Priority Data

Aug. 30, 1996 [JP] Japan ..................................... 8-230198
Jun. 30, 1997 [JP] Japan ..................................... 9-173792

[51] Int. Cl.$^6$ .......................... G01B 11/14; G01B 11/26; G01N 21/00
[52] U.S. Cl. .......................... 356/375; 356/73.1; 356/153
[58] Field of Search ................... 356/153, 73.1, 356/375

[56] References Cited

U.S. PATENT DOCUMENTS 5,218,415  6/1993  Kawashima .

FOREIGN PATENT DOCUMENTS

| 0 506 438 A1 | 9/1992 | European Pat. Off. . |
| 0 646 769 A1 | 4/1995 | European Pat. Off. . |
| WO 96 07118 | 3/1996 | WIPO . |

OTHER PUBLICATIONS

Abstract JP 58 092805 A (Nihon Kougaku Kogyo, KK), Jun. 2, 1983.

*Primary Examiner*—Robert H. Kim
*Assistant Examiner*—Amanda Merlino
*Attorney, Agent, or Firm*—Parkhurst & Wendel, L.L.P.

[57] ABSTRACT

In a retainer holding a plurality of optical transmission members at given positions, a position of an optical center of each of the optical transmission members is measured at a high measuring accuracy. In this case, a lens system forming a beam waist in its output beam is arranged so as to oppose to an end face of each of the optical transmission members, and then the output beam is input to the optical transmission member, and subsequently a position of the lens system is measured when a light intensity of a beam emanated from the optical transmission member is maximum, and thereafter a position of the optical transmission member is calculated from the measured value.

14 Claims, 8 Drawing Sheets

FIG_1a

FIG_1b

FIG_1c

FIG_7

FIG. 8

METHOD OF MEASURING POSITIONS OF OPTICAL TRANSMISSION MEMBERS

BACKGROUND OF THE INVENTION

1. Field of the Invention

The present invention relates to a method for accurately measuring each position of optical transmission members such as optical fibers and the like in a retainer holding these optical transmission members.

2. Description of Related Art

There are known various substrates for fixing optical fibers with a diameter of, for example, about 125 µm. In any substrates, if an optical axis of the optical fiber fixed to the substrate is deviated from a given position, a transmission loss between the optical fiber and another optical transmission means becomes large. Therefore, when grooves for fixing the optical fibers are formed on the substrate, it is required to have a very high working accuracy of, for example, not more than 0.5 µm. In such a substrate, there is adopted, for example, a method wherein grooves of V-shaped section are formed on the substrate, and optical fibers are placed in the respective grooves and then the optical fiber is fixed in the groove with a resin or a solder.

Figure 1A:
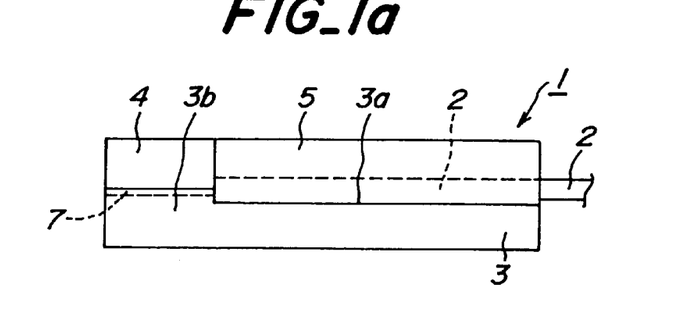
Figure 1B:
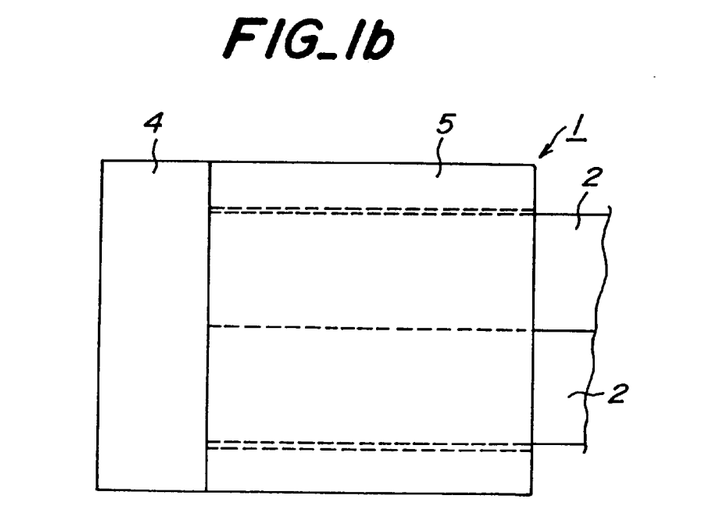
Figure 1C:
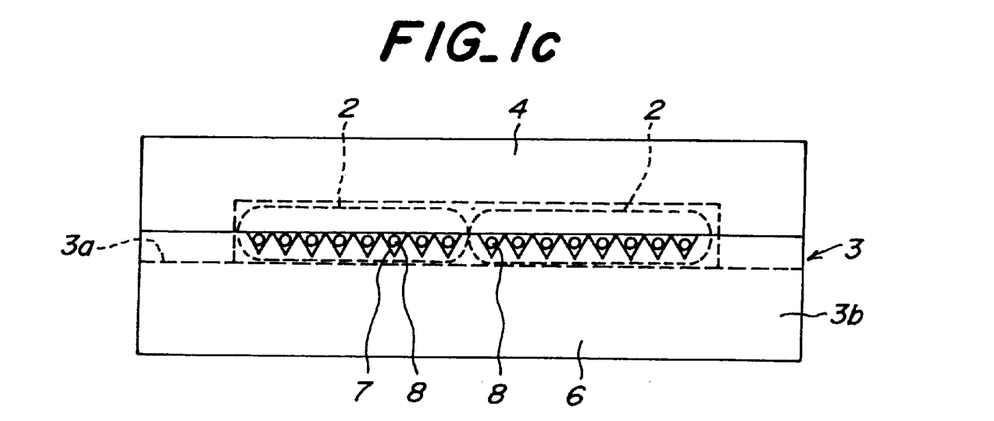

FIG. 1(a) is a front view schematically showing an embodiment of the optical fiber retainer provided with the above substrate for the fixation of the optical fibers, and FIG. 1(b) is a plan view schematically showing this retainer, and FIG. 1(c) is a side view of the retainer viewed from left side of FIG. 1(b). The optical fiber retainer 1 comprises a substrate 3 for fixing the optical fibers. The substrate 3 is comprised of a stepped portion 3a and a holding portion 3b, in which a covering 2 of optical fibers is fixed to the stepped portion 3a and a given row number of grooves 7 are formed on the holding portion 3b. Each of the grooves 7 extends from an end face 6 of the holding portion 3b toward the stepped portion 3a. An optical fiber 8 is placed into the groove 7 and then fixed thereto with a resin or the like. A lid 4 is put over the holding portion 3b, and a lid 5 is put over the covering 2.

There will be described a method for manufacturing such an optical fiber array. At first, there is provided the substrate 3 for fixing the optical fibers, which may be made from ceramic or glass. Each of the grooves 7 is a fine groove having a depth of, for example, about one hundred several tens µm. The optical fibers 8 are individually placed and aligned in the grooves 7.

Since the optical fiber array is used to couple with an optical waveguide substrate or the like, it is necessary to accurately measure each position of the optical fibers. Because the optical waveguide can be formed with an accuracy of ±0.2 µm, for example, by a semiconductor process. Assuming that optical fibers are coupled with optical waveguides having the same profile as the optical fiber among various optical waveguides, when a deviation between an optical center of the optical fiber and that of the optical waveguide is 1.5 µm, a coupling loss of not less than 0.4 dB is caused. Since the coupling loss is desired to be not more than 0.2 dB, the deviation between both the optical centers is required to be not more than 1.0 µm. For this purpose, it is required to measure the deviation of the core position of the optical fiber from an ideal or designed position with a measuring accuracy of ±0.1–0.2 µm.

Nevertheless, it was impossible to measure the core position of the optical fiber with such a high accuracy. Namely, the shape of the groove accommodating the optical fiber can be measured by means of a contact type shape measuring device, but the position of the optical fiber can not directly be measured by such a device. This is due to the fact that since an end face of the optical fiber is machined to be flat by polishing, the position of the optical fiber can not be known even when the contact type shape measuring device is applied to the end face of the optical fiber array. If the optical fiber completely contacts with the groove, it is possible to calculate the fixed position of the optical fiber from the position and shape of the groove with a high accuracy. However, the optical fiber is actually in contact with the groove wall surface at a slight clearance, so that it is impossible to calculate the position of the optical fiber with the aforementioned high accuracy.

In order to solve this problem, the present inventors considered to measure the core position of the optical fiber by means of a universal tool microscope. In the universal tool microscope, a work is placed on a movable stage, so that a coordinate is indicated in the positioning through the microscope. However, in conventional universal tool microscope, the measuring accuracy is only about ±1 µm. Judging from the measuring accuracy of the stage itself, it is difficult to more improve the measuring accuracy over the above value.

Furthermore, the present inventors considered that a laser beam is passed through each optical fiber to receive a beam transmitted from the optical fiber with CCD and the optical center of the optical fiber is measured from the received beam. However, it is very difficult to measure a profile of the beam. Particularly, when the beam transmitted from the optical fiber is directly observed, a beam disordered from a circular shape is seen due to the problem of a pixel accuracy of CCD and the like. In order to determine the center of this beam, it is necessary to calculate the optical center by normalizing the profile of non-circular beam, but there is actually a limit in the measuring accuracy. In case of using a commercially available beam profiler, the measuring accuracy was only about ±10 µm. Moreover, the measuring accuracy may theoretically be enhanced to a higher level by trial-manufacturing a high accuracy lens system and a stage. In the latter case, however, the measuring accuracy is 0.5 µm at most.

SUMMARY OF THE INVENTION

It is, therefore, an object of the present invention to measure a position of an optical center of each of optical transmission members at a higher measuring accuracy in a retainer holding the optical transmission members at given positions.

According to a first aspect of the invention, there is the provision of a method for measuring a position of an optical center of an optical transmission member in a retainer holding a plurality of optical transmission members at given positions, which comprises the steps of:

arranging a lens system forming a beam waist in a light flux of an output beam so as to oppose to an end face of each of the optical transmission members in the retainer;

inputting an output beam from the lens system to the end face of the optical transmission member;

measuring a position of the lens system when a light intensity of a beam emanated from the optical transmission member is maximum; and calculating a position of the optical transmission member from the measured value.

Furthermore, a second aspect of the invention is a method for manufacturing an optical device provided with an assembly of a substrate having a plurality of optical waveguides and an optical transmission member retainer, which comprises the steps of:

measuring a position of each of optical transmission members in the retainer according to the above mentioned method;

selecting a retainer having a margin for error in an optical center of each of the optical transmission members of not more than 1.0 μm from the measured retainers; and joining the selected retainer to the substrate to optically couple each of the optical transmission members with each of the optical waveguides.

Furthermore, a third aspect of the invention is a method for manufacturing an optical device provided with an assembly of an optical element device having a plurality of optical elements and an optical transmission member retainer, which comprises the steps of:

measuring a position of each of optical transmission members in the retainer according to the above mentioned method;

selecting a retainer having a margin for error in an optical center of each of the optical transmission members of not more than 1.0 μm from the measured retainers; and joining the selected retainer to the optical element device to optically couple each of the optical transmission members with each of the optical elements.

As the optical transmission member, an optical fiber is preferable, but a passive optical transmission member such as load lens or the like may be used. The optical element is not particularly limited, but an emitting element oscillating a laser beam, and a receiving element receiving the laser beam are favorable.

BRIEF DESCRIPTION OF THE DRAWINGS

The invention will be described with reference to the accompanying drawings, wherein:

FIG. 1(*a*) is a schematic front view of an embodiment of the optical transmission member retainer provided with a substrate for fixing optical fibers;

FIG. 1(*b*) is a schematic plan view of the retainer;

FIG. 1(*c*) is a left side view of the retainer;

DESCRIPTION OF THE PREFERRED EMBODIMENTS

Figure 2:
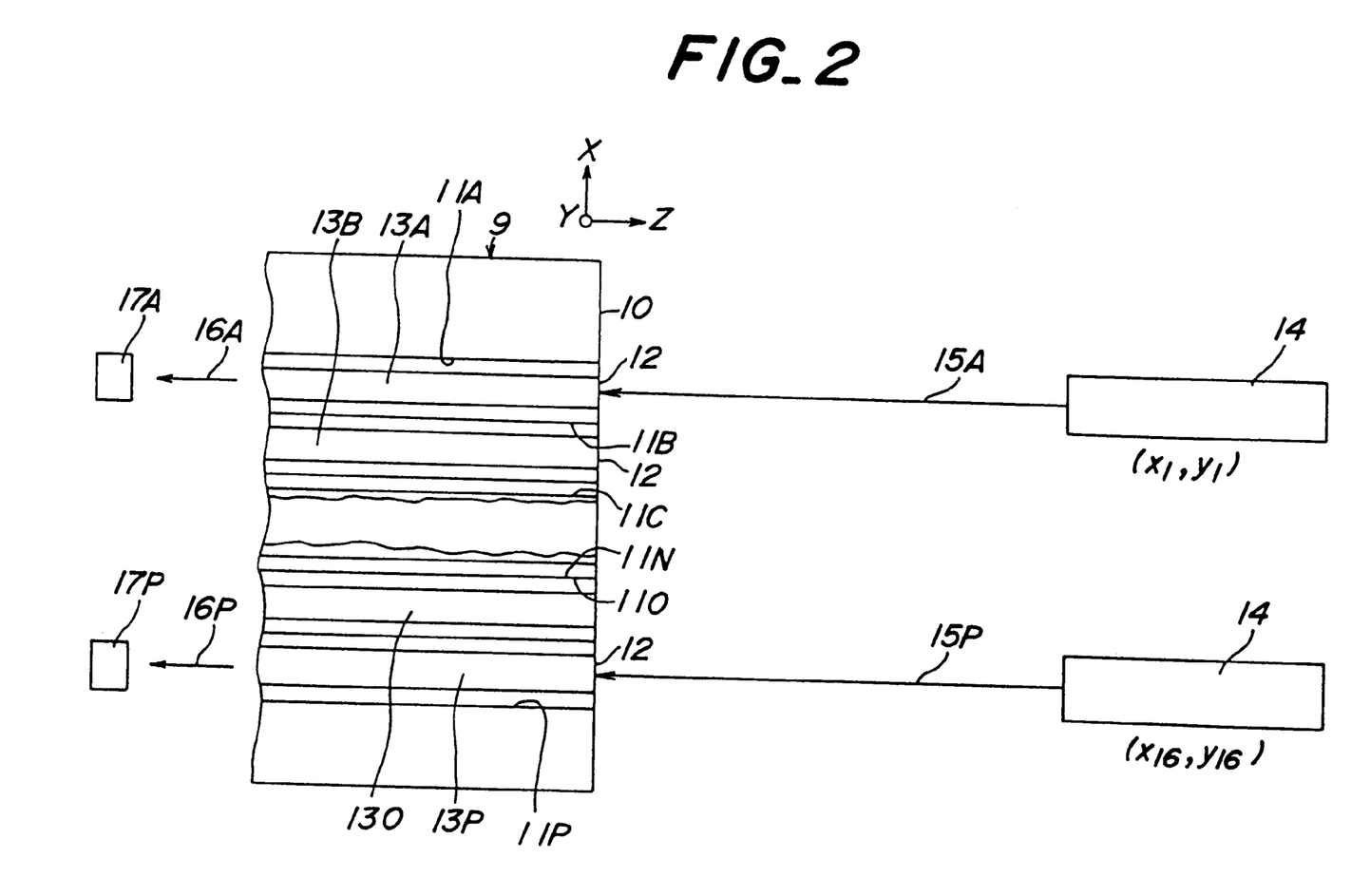
FIG. 2 is a schematic view illustrating an embodiment of the measuring theory according to the present invention.

The theory of the present invention and preferred embodiments thereof will be described by properly referring the drawings. FIG. 2 is a schematic view illustrating an embodiment of the measuring theory according to the present invention. In an optical fiber retainer 9 are formed a given row number of grooves, for example, 16 rows of grooves 11A, 11B, 11C, - - - 11N, 11O, 11P. In the illustrated embodiment, the grooves are formed so as to extend in parallel to each other, but each of the grooves may be curved. In these grooves are accommodated optical fibers 13A, 13B, 13C, - - - 13N, 13O, 13P, respectively. An end face 12 of each of the optical fibers is exposed at the side of an end face 10 of the retainer 9. Each of these end faces is subjected to optical polishing.

There is provided a lens system 14 forming a beam waist in a light flux of an output beam thereof. The lens system may be a single collimator or a combination of plural lens. The lens system 14 is arranged so as to oppose to an end face of an optical fiber 13A in the retainer 9, and an output beam 15A from the lens system is input to the end face 12 of the optical fiber 13A and emanated from the other end face of this optical fiber 13A as shown by arrow 16A, which is received by a receiving element 17A to measure an intensity of light. In this case, the lens system 14 is moved in X-axis direction and Y-axis direction, during which a change of light intensity accompanied with the movement is measured. And also, a position ($x_1$, $y_1$) of the lens system 14 is measured when a light intensity is maximum.

A series of the above operations is carried out with respect to each of the optical fibers 13B, 13C, - - - 13O, 13P. For example, as regards the optical fiber 13P, reference character 15P is an output beam from the lens system 14, reference character 16P a beam emanated from the optical fiber 13P, and reference character 17P a receiving element for the beam 16P. In this case, the lens system 14 is moved in X-axis direction and Y-axis direction, during which a change of light intensity accompanied with the movement is measured. Further, when the light intensity becomes maximum, a position ($x_{16}$, $y_{16}$) of the lens system 14 is measured.

When an optical axis of the optical fiber is coincident with that of the lens system at maximum, the light intensity of the beam emanated from the optical fiber becomes maximum. Therefore, the position of the lens system when the light intensity of the beam emanated from the optical fiber becomes maximum is to be substantially coincident with the positions of the optical fiber on X-axis and Y-axis. As a result, the core position of the optical fiber or the position of the optical center thereof can be known by measuring the position of the lens system.

It is particularly important that the change of the light intensity in the emanated beam is very sensitive to the movement of the position of lens system, and can be easily discriminated even at the movement of the position of not more than 0.1 μm. Therefore, according to the method of the present invention, the position of each of the optical fibers previously fixed to the retainer can be measured at a very high accuracy.

From a viewpoint of the theory according to the present invention, there is no limitation with respect to the method for detecting an optimum position of the lens system in correspondence with the respective optical fiber. However, the measuring accuracy affects the measuring accuracy of the whole device. In general, it is necessary that the retainer 9 and the lens system 14 are separately placed on movable stages and these stages are moved in the directions of X, Y and Z axes. In this case, the moving mechanism of each of the stages is controlled by a computer according to usual manner, so that the relative position (x, y) of the lens system 14 to the retainer 9 can be known by command values from the computer relating to the position movement of the stage. However, there is a certain clearance between the stage and the moving mechanism therefor, which corresponds to the measuring error.

In a preferable embodiment, therefore, the position of the lens system or that of the stage provided with lens system is directly measured. Particularly, it is preferred to directly measure the distance from a laser rangefinder by irradiating a laser beam from the laser rangefinder to the lens system 14 or the stage therefor. In this case, it is more preferable to separately provide a laser rangefinder for measuring the position in X-axis direction and a laser rangefinder for measuring the position in Y-axis direction.

Figure 3:
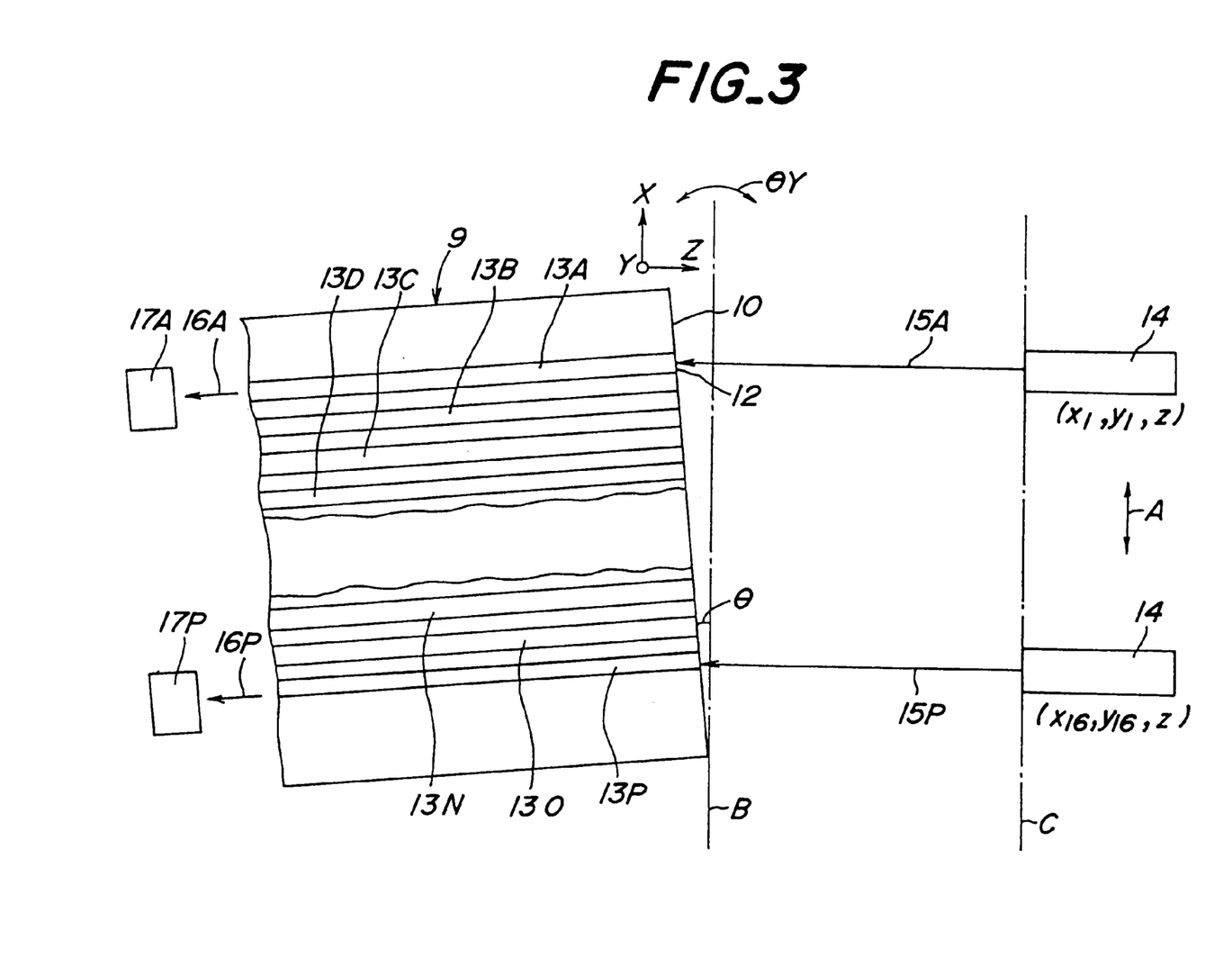
FIG. 3 is a schematic view illustrating another embodiment of the measuring theory according to the present invention, in which an end face 10 is inclined by θ degrees with respect to X-axis.

There is found the following problem during studying and conducting the present invention. Referring to FIG. 3, the problem will be explained. In this Figure the same members as shown in FIG. 2 have the same reference characters, omitting the respective corresponding explanation. Namely, the positions of the optical fiber on X axis and Y axis can be known by the above mentioned method, so that it is considered that this measurement is not theoretically influenced by a distance from the lens system 14 to the end face 10 of the retainer 9.

In this measurement, however, it is necessary to move the lens system 14 in parallel to the end face 10, but it was found to be very difficult. Because, in order to know the position of the optical fiber on the X-axis, it is necessary to move the lens system 14 in X-axis direction to measure the change of light intensity in the beam emanated from the optical fiber accompanied therewith, but it is difficult to match the end face 10 of the retainer 9 with the X-axis at a higher accuracy.

For example, when the positions of the lens system 14 exhibiting maximum light intensity of beam emanated from optical fibers 13A and 13P located at both side ends of the retainer are $(x_1, y_1, z)$ and $(x_{16}, y_{16}, z)$, a distance between the optical fiber 13A and the optical fiber 13P on the X axis is calculated as $(x_{16}-x_1)$. However, the actual distance between the optical fiber 13A and the optical fiber 13P is larger than the calculated value and is $(x_{16}-x_1)/\cos\theta$.

In fact, when a pitch of the optical fibers is 250 μm, in the retainer 9 having, for example, 16 optical fibers therein, the distance between the optical fibers 13A and 13P located at both ends becomes 250 μm×15=3750 μm. In the actual measurement, if an angle of an optical axis of each of the optical fibers 13A and 13P with respect to output beams 15A and 15P from the lens system 14 is shifted by 0.7°, the actually measured distance is 3750 μm×cos 0.70°=3749.7 μm, which is deviated from the true value by 0.3 μm. This measuring error is added with other measuring errors.

As a method of matching the optical axis of the optical fiber with that of the output beam from lens system 14, a method using an image processing was considered. That is, the end face 10 of the optical fiber retainer 9 is observed from the upper part (the Y-axis direction), whereby several points are selected from the upper edge of the end face 10, and luminances thereof are measured. Thereafter, a hypothetical line corresponding to the edge of the end face 10 is depicted based on the measured values of the luminance. After an angle between the hypothetical line corresponding to the edge of the end face 10 and the output beam from the lens system 14 to the optical fiber is measured, the retainer 9 is rotated toward θY direction so that the above angle becomes a right angle.

However, this method is found to have the following problem. That is, the accuracy in the image processing itself is about ±0.1 μm. Further, if the edge of the end face 10 is a right angle, the position of the end face can be accurately known, but the actual edge of the end face 10 is frequently broken off or rendered into a gently slant surface. For this reason, the precisely hypothetical line can not be depicted in correspondance with the edge of the end face 10, so that there is caused a large deviation between the position of the hypothetical line and that of the edge. Moreover, the precision in the polishing of the end face is about ±0.2°. And also, the position of the end face 10 is not precisely coincident with the edge of the end face 10. Additionally, it is difficult to accurately grasp the position of the optical axis of the lens system 14.

Figure 4:
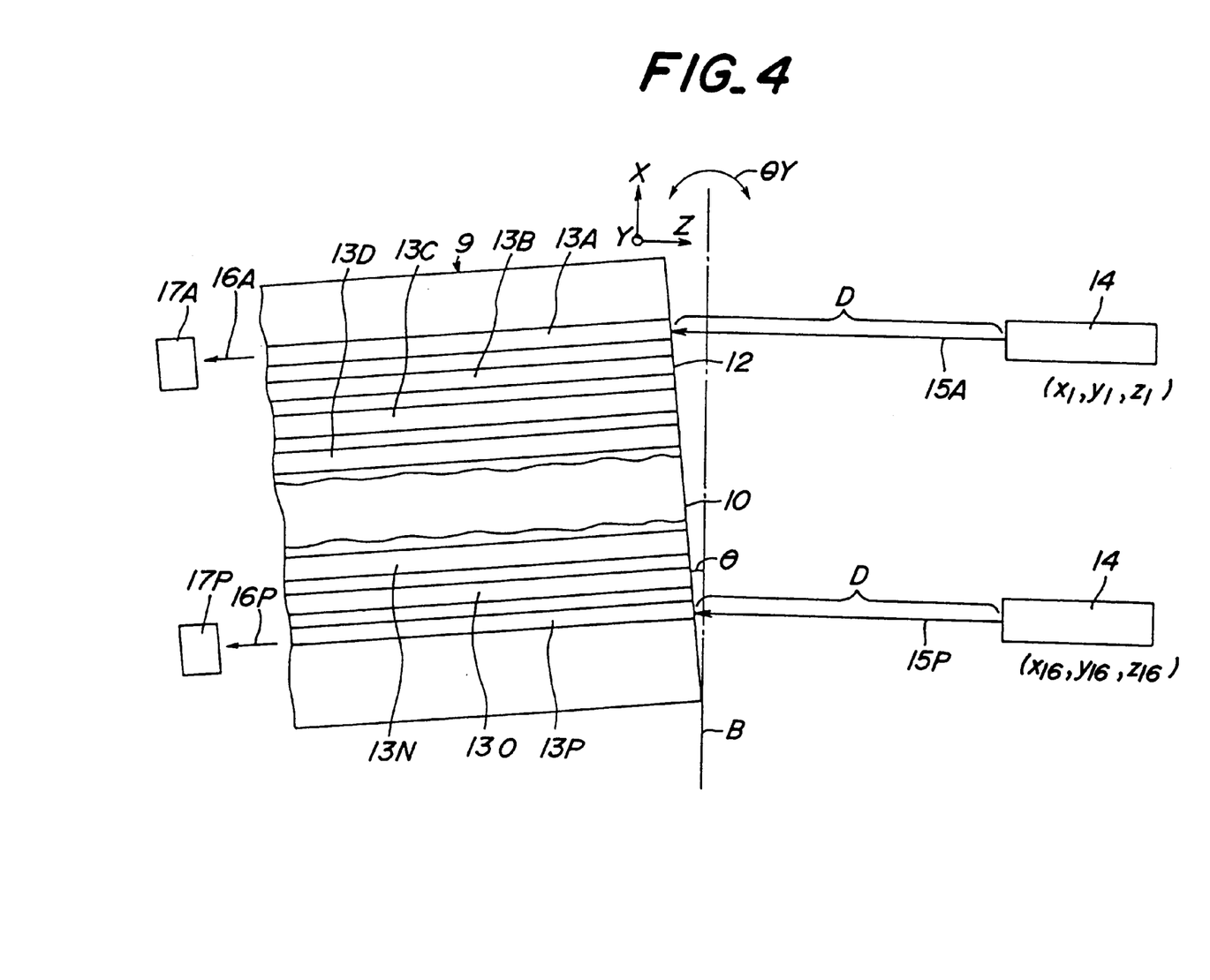
FIG 4 is a schematic view illustrating the other embodiment of the measuring theory according to the present invention.

In the present invention, therefore, it is most preferable to adopt the following method. As shown in FIG. 4, it is assumed that an inclination angle θ (θ>0) is caused between the end face 10 of the retainer 9 and the X-axis. At this state, the output beam 15A from the lens system 14 is input into the end face 12 of the optical fiber 13A to measure a light intensity of the beam 16A emanated from the optical fiber 13A as mentioned above.

In the embodiments of FIGS. 2 and 3, the position of the lens system 14 on the Z axis is fixed to a constant value (z). On the contrary, in the present embodiment, the lens system 14 is moved in the Z-axis direction. Then, all positions $(x_1, y_1, z_1)$ of the lens system 14 on the X, Y and Z axes are measured when the light intensity of the emanated beam 16A is maximum. In this case, the output beam 15A from the lens system 14 has a beam waist, so that when a distance from the end face 12 becomes a given value D, a beam diameter of an input beam to an end face of the optical fiber 13A becomes minimum and hence the light intensity of the emanated beam 16A becomes maximum.

The same procedure as described above is carried out with respect to at least one of the other optical fibers, preferably the optical fiber 13P located at an end portion of the retainer, whereby all positions $(x_{16}, y_{16}, z_{16})$ of the lens system 14 on the X, Y and Z axes are measured when the light intensity of the emanated beam 16P is maximum. In this case, the distance from the end face 12 of the optical fiber 13P to the lens system 14 is D.

Figure 5:
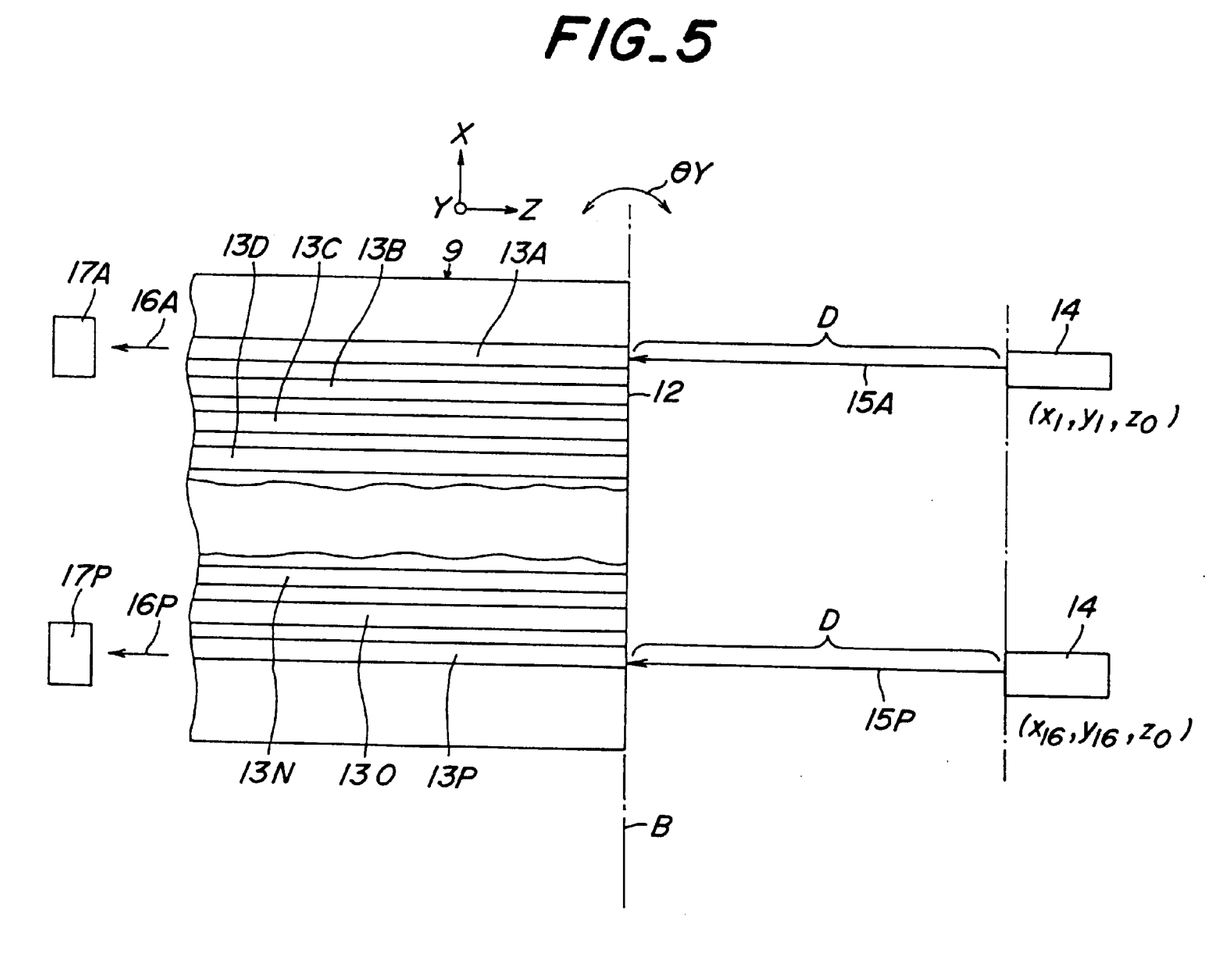
FIG. 5 is a schematic view illustrating a state of rotating a retainer 9 by a correction angle of θ degrees.

The above inclination angle θ can be calculated from the difference between z1 and z16. Based on the calculated result, the retainer 9 is rotated by a corrected angle θ in the direction of θY as shown in FIG. 5. As a result, the retainer 9 rotates until the positions of the lens systems 14 on the Z-axis take an equal value (Z0) to each other. Even after the rotation, the distance D between the lens system 14 and the end face 12 is the same as in FIG. 4. Therefore, the optical axes of the output beams 15A and 15P from the lens systems 14 are coincident with the optical axes of the respective optical fibers. After the rotation, the positions $(x_1, y_1)$, $(x_{16}, y_{16})$ of the lens systems 14 on the X and Y axes are measured when the light intensities of the emanated beams 16A and 16P become maximum.

Viewing from the actually measured examples, the measuring accuracy in the direction of the optical axis (Z-axis direction) was about ±4 μm. When this result is applied to the case of the optical fiber array having a pitch of 250 μm as mentioned above, it corresponds to ±0.06° as an angle θ and is 0.002 μm as an influencing degree to the positions of the lens system on the X and Y axes.

Figure 6:
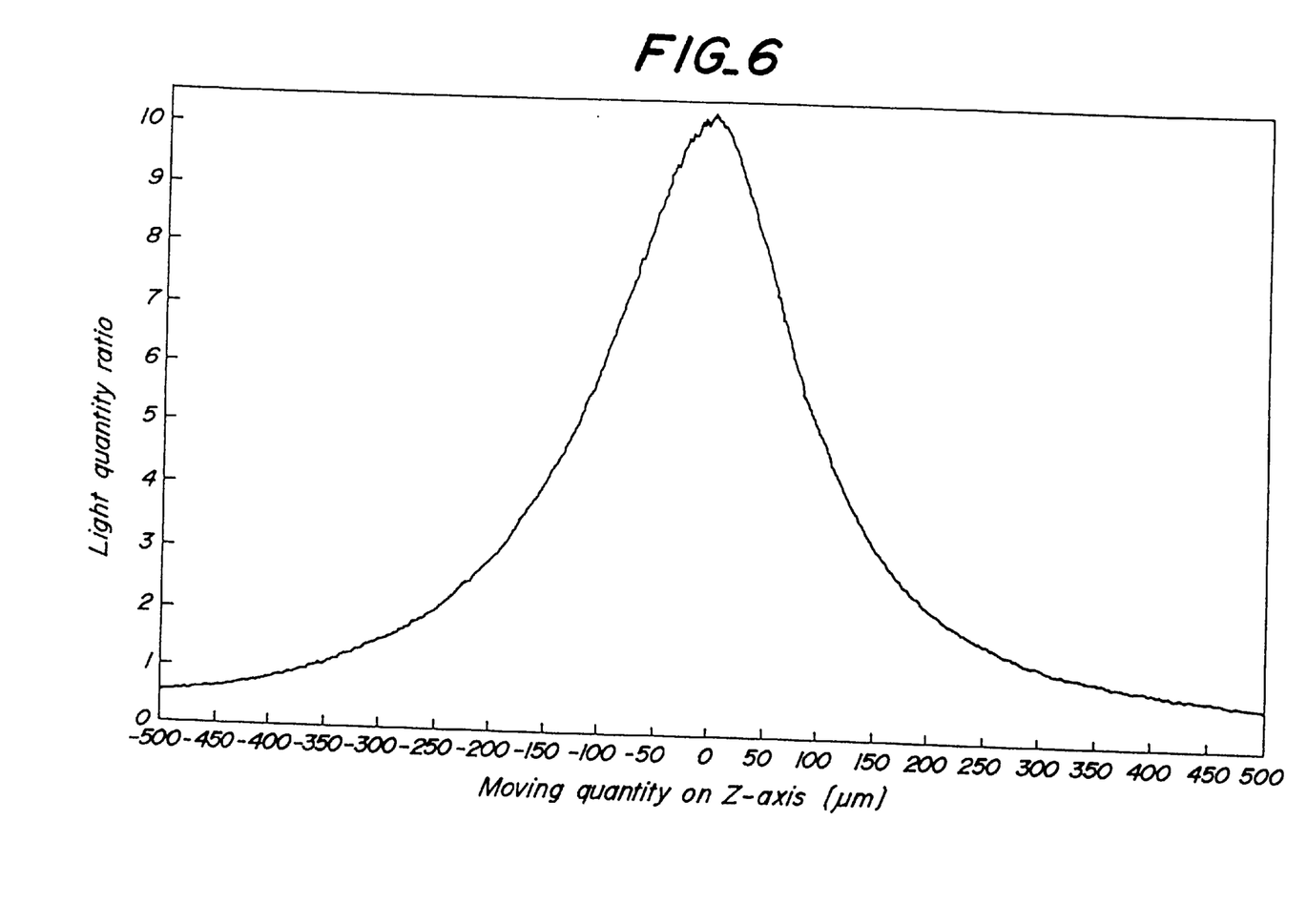
FIG. 6 is a graph showing a relation between a moving quantity and a light quantity ratio in a lens system 14 on Z-axis.
Figure 7:
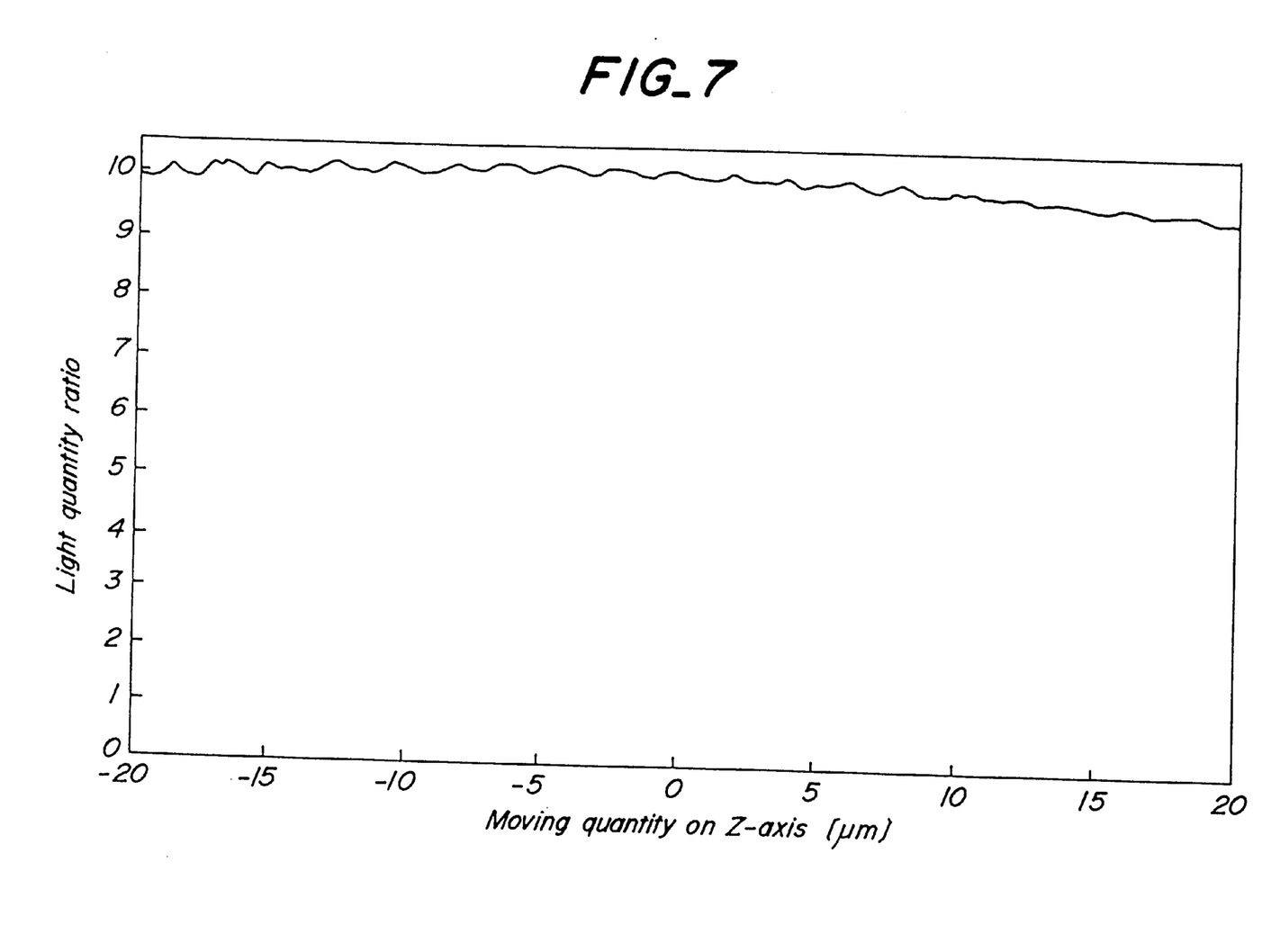
FIG. 7 is a graph enlargedly illustrating a vicinity of a peak in the graph of FIG. 6.

Next, there will be described a preferred method for measuring a first position of the lens system 14 on the Z-axis when the light intensity of the beam emanated from the optical fiber becomes maximum. FIGS. 6 and 7 are graphs showing a relation between a ratio of light intensity of the emanated beam (light quantity ratio) and a moving distance of a collimator on Z-axis when a typical collimator is used as the lens system 14. In FIGS. 6 and 7, the light quantity ratio on an ordinate axis shows a relative value when the maximum value of the light intensity of the emanated beam is standardized to about 10. And also, an abscissa axis shows a moving quantity from a starting point when the moving quantity on Z-axis exhibiting an approximately maximum light quantity ratio is set to 0.

Particularly, as seen from the graph of FIG. 7, the change of the light quantity ratio to the change of the moving quantity on the Z-axis is small when the light quantity ratio becomes maximum, so that it is difficult to determine the position of the collimator on the Z-axis when the light quantity ratio is maximum and the error becomes large. Such a graph depends on the form of the light flux of the collimator. Therefore, a pre-determined value is first selected in a large range of the change of the light quantity ratio to the change of the moving quantity on the Z-axis, concretely within a range of 40–90% of the maximum value of the light quantity ratio, and then a third position of the lens system on the Z-axis is measured when the light quantity ratio reaches to the above predetermined value, and further a fourth position of the lens system on the Z-axis is measured when the light quantity ratio reaches to the pre-determined value at an opposite side across the position of the maximum light quantity ratio. The first position can be calculated as a midpoint between the third position and the fourth position.

As regards each of the optical fiber 13A, 13B, - - - 13P, the lens system 14 is moved in the directions of the X axis and Y axis to measure the change of the received light quantity accompanied with the movement as mentioned above, during which a first position of the lens system 14 on X-axis and Y-axis is measured when the received light intensity is maximum. Even in this case, the change of the received light intensity is small to the moving quantity on the X axis and Y axis when the received light intensity becomes maximum. For this end, the error of the positions on the X axis and Y axis becomes large when the received light intensity becomes maximum.

Therefore, a predetermined value is first selected in a large range of the change of the received light intensity to the change of the moving quantity on the X axis and Y axis, concretely within a range of 40–90% of the maximum value of the received light quantity and a third positions of the lens system 14 on the X axis and Y axis is measured when the received light intensity reaches to the predetermined value. Then, a fourth position of the lens system 14 on the X axis and Y axis is measured when the received light intensity reaches to the predetermined value at an opposite side across the maximum received light intensity. Therefore, the first position can be calculated as a midpoint between the third position and the fourth position.

In the production of the substrate for fixing optical fibers, there is a method of forming grooves by etching silicon material. However, this method has a limitation in the processing accuracy, so that it is difficult to form a V-shaped grooves at a higher accuracy. For this end, there can be used a method of forming the groove by polishing a ceramic material such as alumina, agate, zirconia and the like, or glass material. In the latter case, for example, a ceramic shaped body is sintered and subjected to plane-polishing to form a flat surface, and then subjected to a polishing treatment with diamond grinding wheel to form grooves in the flat surface. Alternatively, the grooves for fixing optical fibers can be formed by pressure molding of the substrate.

As the glass material, optical glass (BK-7), borosilicate glass, soda-lime glass, ion exchange glass, $LiO_2$—$Al_2O_3$—$SiO_2$ glass are particularly preferable.

The present invention will be explained in more detail with respect to an example below.

Figure 8:
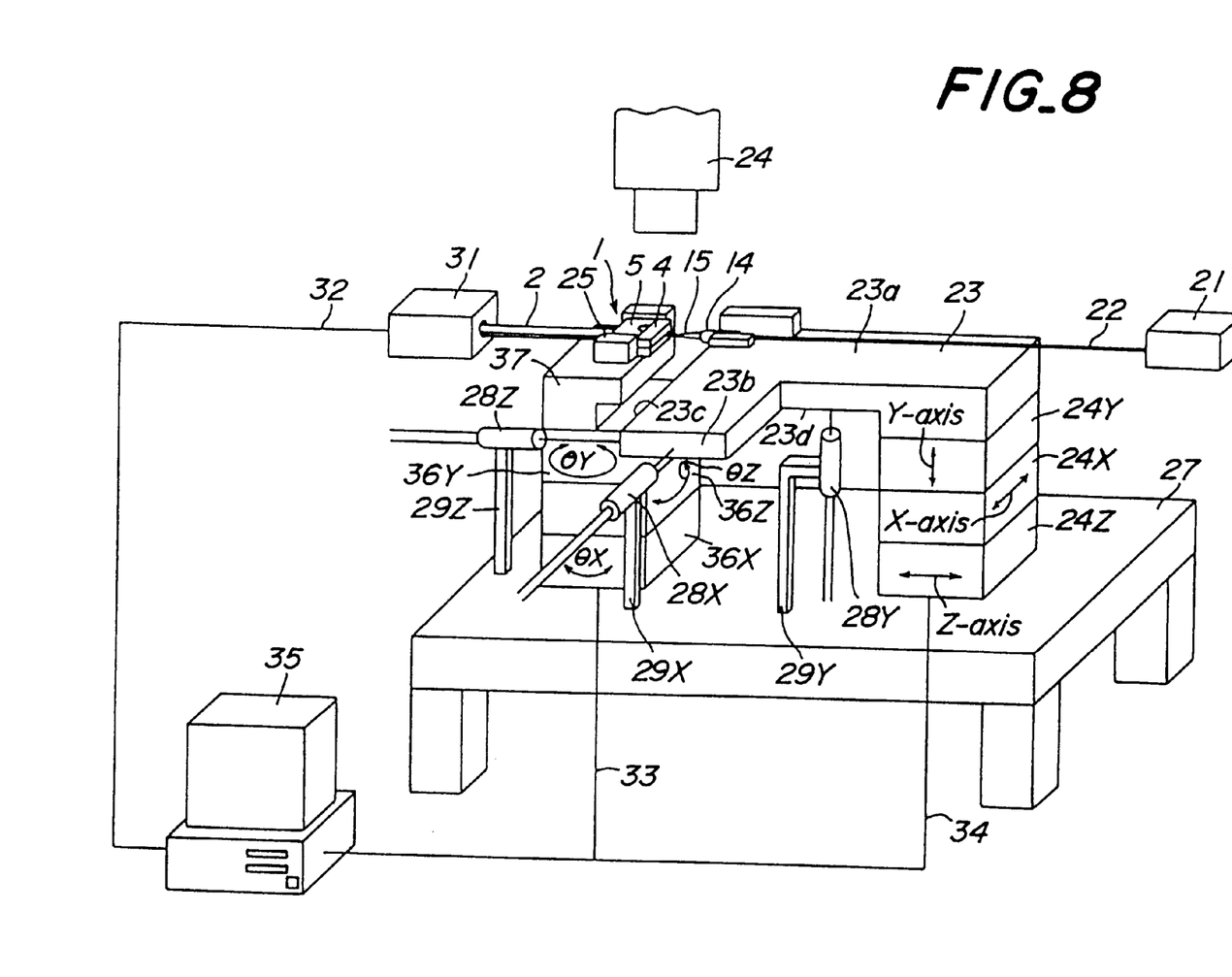
FIG. 8 is a schematic perspective view of a measuring apparatus used in the example according to the present invention.

FIG. 8 is a schematic perspective view showing a measuring apparatus for use in the example according to the present invention.

An optical fiber retainer 1 for accommodating the sixteen optical fibers in V-shaped grooves was manufactured as shown in FIG. 1, and then the core position of each of the optical fibers was measured in the manner as mentioned above. In this case, a material of a substrate 3 for fixing the optical fibers was borosilicate glass and the V-shaped grooves were formed by means of pressure molding. A pitch between the optical fibers was 250 μm. The retainer 1 was a rectangular solid having an outer dimension of 6×6×2 mm. As the optical fiber, a single mode optical fiber having a wavelength of 1.3 μm was used.

In FIG. 8, a collimator 14 is placed on an end potion of an upper surface 23a of a stage 23, and connected to a light-emitting diode 21 through an optical fiber 22. The stage 23 is placed on a Y-axis stage 24Y, a X-axis stage 24X and a Z-axis stage 24Z. Each of the stage 24Y, 24X and 24Z is connected to a computer 35 through a cable 34, whereby a moving value of each stage can be continuously measured based on a demand value from the computer to the movement of the stage. The whole of the measuring apparatus is placed on a vibration absorption table 27.

A laser rangefinder 28X is arranged at a position opposite to a side surface 23b of the stage 23 and fixed to the vibration absorption table 27 through a support member 29X. A laser rangefinder 28Z is arranged at a position opposite to a side surface 23c of the stage 23 and fixed to the vibration absorption table 27 through a support member 29Z. A laser rangefinder 28Y is arranged at a position opposite to a rear surface 23d of the stage 23 and fixed to the vibration absorption table 27 through a support member 29Y. Each of these laser rangefinders was used to have a resolution of about 0.01 μm.

The reason why a laser beam from each of the laser rangefinders is irradiated to the stage 23 is due to the fact that the position relation of each laser rangefinder to the stage 23 is substantially constant and the condition, position and angle of a surface irradiated by the laser beam are kept substantially constant, so that the measuring error can be minimized. In the stage 23, surfaces to be irradiated by the laser beam are favorable to be a mirror surface.

In the collimator 14, a beam waist was about 15 μm. The term "beam waist" means a radius of a beam at a position showing a minimum beam diameter. Reference numeral 15 is a laser beam.

A stage 37 is placed on a θY axis stage 36Y, θZ axis stage 36Z and θX axis stage 36X, while the stage 36X is placed on the vibration absorption table. Each of the stage 36X, 36Y and 36Z is connected to the computer 35 through a cable 33, whereby a rotating angle of each stage can be continuously measured based on a demand value from the computer to the rotation of the stage.

The retainer 1 was placed on the stage 37. In this case, the retainer 1 was positioned by a jig 25 on the stage 37 so as to make the optical fiber in the retainer approximately in parallel to the output beam from the collimator. An end face at the side of the holding portion of the retainer was previously washed with alcohol. An end portion of each of the optical fibers located at the other side of the retainer was previously cut by a commercially available cuter and then the cutted end face was washed. Such an end face of the optical fiber was connected to a light receiving element 31 connected to the computer 35 through a cable 32.

A rough adjustment in θY direction and θZ direction was carried out by putting images of the end face of the retainer, the end face of the collimator and their surroundings in a CCD camera 24, This is because the initial mounting position of the retainer usually differs largely.

As the laser beam input to the optical fiber, there was used a laser beam having a wave length of 1.55 μm. Although the optical fibers in the optical fiber array have a slight scattering in the wavelength, it is important to determine a position exhibiting a maximum output of the emanated beam for the measurement of the core position, so that a laser beam having a wavelength longer than that of the optical fiber (1.3 μm) was used in order to transmit the laser beam in the single mode as far as possible. Moreover, in order to prevent the lowering of the measuring accuracy due to the influence of air flow, the stages were covered with a lid as a whole.

At first, the position of the optical fiber 13A located at the end of the retainer was roughly detected manually. Next, the adjustment of the optical axis of the optical fiber to the optical axis of the output beam from the collimator was carried out according to the above mentioned method. In this case, the X-axis stage 24X and the Y-axis stage 24Y were driven to determine a point where the light intensity of the emanated beam became maximum. Next, the Z-axis stage 24Z was driven to determine a point where the light intensity of the emanated beam became maximum.

Thus, a graph as shown in FIG. 6 was obtained. Concretely, two positions of the collimator on the Z-axis were measured when the light quantity ratio corresponds to 70% of the maximum light quantity, and then a midpoint on the Z-axis was calculated from the two measured values. Thereafter, a necessary correction angle θ is calculated from the above calculated values. Finally, the θY stage 36Y was rotated by the latter calculated correction angle θ.

Next, there was measured a core position of each of the optical fibers. In this case, the position of the stage 23 holding the collimator was measured by means of the laser rangefinders 28X, 28Y and 28Z. From the measured results was calculated a coordinate of a center of each of the optical fibers. When a line connecting the center of the first optical fiber 13A to the center of the sixteenth optical fiber 13P was regarded as X-axis, a dividing point of the X-axis every a pitch of 250 μm was made to be an ideal position for each of the optical fibers. Then, there was calculated a deviation of the actually measured position of the center of each of the optical fiber from the respective ideal position.

With respect to the same retainer, the above measurement was repeated three times. The results are shown in Table 1.

TABLE 1

| Optical fiber number | First measurement | | Second Measurement | | Third measurement | |
|---|---|---|---|---|---|---|
| | Deviation from ideal position on X-axis | Deviation from ideal position on Y-axis | Deviation from ideal position on X-axis | Deviation from ideal position on Y-axis | Deviation from ideal position on X-axis | Deviation from ideal position on Y-axis |
| 1 | 0.53 | 0.00 | 0.50 | 0.00 | 0.46 | 0.00 |
| 2 | −0.10 | 0.35 | −0.02 | 0.30 | 0.09 | 0.45 |
| 3 | −0.42 | 0.44 | −0.45 | 0.47 | −0.24 | 0.47 |
| 4 | −0.40 | 0.19 | −0.41 | 0.17 | −0.34 | 0.25 |
| 5 | −0.11 | 0.01 | −0.04 | 0.04 | 0.05 | 0.07 |
| 6 | −0.19 | 0.14 | −0.20 | 0.22 | −0.09 | 0.21 |
| 7 | −0.29 | 0.65 | −0.25 | 0.64 | −0.19 | 0.85 |
| 8 | −0.07 | 0.30 | −0.10 | 0.29 | 0.12 | 0.33 |
| 9 | −0.19 | 0.18 | −0.25 | −0.27 | −0.14 | −0.21 |
| 10 | −0.19 | 0.61 | −0.19 | 0.65 | −0.03 | 0.74 |
| 11 | −0.49 | 0.40 | −0.50 | 0.39 | −0.56 | 0.44 |
| 12 | −0.47 | 0.03 | −0.45 | −0.02 | −0.22 | 0.07 |
| 13 | −0.38 | 0.16 | −0.31 | 0.20 | −0.22 | 0.21 |
| 14 | −0.56 | 0.43 | −0.60 | 0.46 | −0.49 | 0.40 |
| 15 | −0.83 | 0.07 | −0.76 | 0.12 | −0.80 | 0.17 |
| 16 | −0.53 | 0.00 | −0.50 | 0.00 | −0.46 | 0.00 |

(unit: μm)

As seen from the results of Table 1, the measuring accuracy of the method according to the present invention is considered to be about ±0.1 μm As mentioned above, according to the present invention, a position of an optical center of each of optical transmission member held at given positions in the optical transmission member retainer can be measured at a high measuring accuracy.

What is claimed is:

1. A method for measuring the position of an optical center of an optical transmission member in a retainer holding a plurality of optical transmission members at given positions, which comprises the steps of:
   arranging a lens system for forming a beam waist in the light flux of an output beam to oppose an end face of each of the optical transmission members in the retainer;
   inputting an output beam from the lens system to the end face of the optical transmission member, the beam having a wavelength longer than the cutoff wavelength of the optical transmission member;
   measuring a position of the lens system when the light intensity of a beam emanated from the optical transmission member is maximum to derive a measured value; and
   calculating a position of the optical transmission member from the measured value.

2. A method according to claim 1, wherein the optical transmission members are held generally parallel to each other, and the lens system is moved along two directions (X-axis and Y-axis) perpendicular to a longitudinal direction (Z-axis) of the optical transmission member to measure the light intensity of a beam emanated from the optical transmission member to thereby measure the positions of the optical transmission member on both the X and Y axes.

3. A method according to claim 2, wherein a first position of the lens system on the Z-axis when the light intensity of a beam emanated from one of the optical transmission members is maximum is measured by moving the lens system on the Z-axis to measure the light intensity of the beam emanated from the optical transmission member;

a second position of the lens system on the Z-axis when the light intensity of a beam emanated from another one of the optical transmission members is maximum is measured by moving the lens system on the Z-axis to measure the light intensity of the beam emanated from the another one of the optical transmission member;

the retainer is rotated to match the first position with the second position; and the lens system is moved along two directions (X-axis and Y-axis) perpendicular to a longitudinal direction (Z-axis) of the optical transmission member to measure the light intensity of the beam emanated from each of the optical transmission members.

4. A method according to claim 3, wherein a third position of the lens system on the Z axis is measured when a measured value of the light intensity of a beam emanated from the optical transmission member reaches a predetermined value within 40–90% of the maximum light quantity of the emanated beam;

a fourth position of the lens system on the Z axis is measured when the measured value of the light intensity reaches the predetermined value on an opposite side across the position of the maximum light quantity; and the first position and the second position are calculated as a midpoint between the third position and the fourth position, respectively.

5. A method for manufacturing an optical device provided with an assembly of a substrate having a plurality of optical waveguides and an optical transmission member retainer, which comprises the steps of:

measuring a position of each of optical transmission members in the retainer selecting a retainer having a margin for error in an optical center of each of the optical transmission members of not more than 1.0 $\mu$m from the measured retainers; and joining the selected retainer to the substrate to optically couple each of the optical transmission members with each of the optical waveguides.

6. A method for manufacturing an optical device provided with an assembly of an optical element device having a plurality of optical elements and an optical transmission member retainer, which comprises the steps of:

measuring a position of each of optical transmission members in the retainer selecting a retainer having a margin for error in an optical center of each of the optical transmission members of not more than 1.0 $\mu$m from the measured retainers; and joining the selected retainer to the optical element device to optically couple each of the optical transmission members with each of the optical elements.

7. A method according to claim 5, wherein the step of measuring a position of each of the optical transmission members comprises:

arranging a lens system for forming a beam waist in the light flux of an output beam to oppose an end face of each of the optical transmission members in the retainer;

inputting an output beam from the lens system to the end face of the optical transmission member, the beam having a wavelength longer than the cutoff wavelength of the optical transmission member;

measuring a position of the lens system when the light intensity of a beam emanated from the optical transmission member is maximum to derive a measured value; and calculating a position of the optical transmission member from the measured value.

8. A method according to claim 7, wherein the optical transmission members are held generally parallel to each other, and the lens system is moved along two directions (X-axis and Y-axis) perpendicular to a longitudinal direction (Z-axis) of the optical transmission member to measure the light intensity of a beam emanated from the optical transmission member to thereby measure the positions of the optical transmission member on both the X and Y axes.

9. A method according to claim 8, wherein a first position of the lens system on the Z-axis when the light intensity of a beam emanated from one of the optical transmission members is maximum is measured by moving the lens system on the Z-axis to measure the light intensity of the beam emanated from the optical transmission member;

a second position of the lens system on the Z-axis when the light intensity of a beam emanated from another one of the optical transmission members is maximum is measured by moving the lens system on the Z-axis to measure the light intensity of the beam emanated from the another one of the optical transmission member;

the retainer is rotated to match the first position with the second position; and the lens system is moved along two directions (X-axis and Y-axis) perpendicular to a longitudinal direction (Z-axis) of the optical transmission member to measure the light intensity of the beam emanated from each of the optical transmission members.

10. A method according to claim 9, wherein a third position of the lens system on the Z axis is measured when a measured value of the light intensity of a beam emanated from the optical transmission member reaches a predetermined value within 40–90% of the maximum light quantity of the emanated beam;

a fourth position of the lens system on the Z axis is measured when the measured value of the light intensity reaches the predetermined value on an opposite side across the position of the maximum light quantity; and the first position and the second position are calculated as a midpoint between the third position and the fourth position, respectively.

11. A method according to claim 6, wherein the step of measuring a position of each of the optical transmission members comprises:

arranging a lens system for forming a beam waist in the light flux of an output beam to oppose an end face of each of the optical transmission members in the retainer;

inputting an output beam from the lens system to the end face of the optical transmission member, the beam having a wavelength longer than the cutoff wavelength of the optical transmission member;

measuring a position of the lens system when the light intensity of a beam emanated from the optical transmission member is maximum to derive a measured value; and calculating a position of the optical transmission member from the measured value.

12. A method according to claim 11, wherein the optical transmission members are held generally parallel to each other, and the lens system is moved along two directions (X-axis and Y-axis) perpendicular to a longitudinal direction (Z-axis) of the optical transmission member to measure the light intensity of a beam emanated from the optical transmission member to thereby measure the positions of the optical transmission member on both the X and Y axes.

13. A method according to claim 12, wherein a first position of the lens system on the Z-axis when the light intensity of a beam emanated from one of the optical transmission members is maximum is measured by moving the lens system on the Z-axis to measure the light intensity of the beam emanated from the optical transmission member;

a second position of the lens system on the Z-axis when the light intensity of a beam emanated from another one of the optical transmission members is maximum is measured by moving the lens system on the Z-axis to measure the light intensity of the beam emanated from the another one of the optical transmission member;

the retainer is rotated to match the first position with the second position; and the lens system is moved along two directions (X-axis and Y-axis) perpendicular to a longitudinal direction (Z-axis) of the optical transmission member to measure the light intensity of the beam emanated from each of the optical transmission members.

14. A method according to claim 13, wherein a third position of the lens system on the Z axis is measured when a measured value of the light intensity of a beam emanated from the optical transmission member reaches a predetermined value within 40–90% of the maximum light quantity of the emanated beam;

a fourth position of the lens system on the Z axis is measured when the measured value of the light intensity reaches the predetermined value on an opposite side across the position of the maximum light quantity;

the first position and the second position are calculated as a midpoint between the third position and the fourth position, respectively.

* * * * *